United States Patent [19]

Rembold et al.

[11] 4,226,142
[45] Oct. 7, 1980

[54] AUTOMATIC TRANSMISSION UTILIZING A SLIDER FOR PRESSURE DISTRIBUTION TO SERVO-ELEMENTS CONTROLLING THE GEAR RATIO

[75] Inventors: Helmut Rembold, Moglingen; Ernst Linder, Muhlacker, both of Fed. Rep. of Germany

[73] Assignee: Robert Bosch GmbH, Stuttgart, Fed. Rep. of Germany

[21] Appl. No.: 929,997

[22] Filed: Aug. 1, 1978

[30] Foreign Application Priority Data

Oct. 1, 1977 [DE] Fed. Rep. of Germany ....... 2744286

[51] Int. Cl.² .............................................. B60K 41/04
[52] U.S. Cl. ...................................................... 74/867
[58] Field of Search ................. 74/867, 865, 866, 868, 74/863, 864

[56] References Cited

U.S. PATENT DOCUMENTS 3,949,627  4/1976  Murakami ............................. 74/867
3,958,466  5/1976  Espenschied ......................... 74/867

Primary Examiner—Peter P. Nerbun
Attorney, Agent, or Firm—Frishauf, Holtz, Goodman & Woodward

[57] ABSTRACT

In a hydraulic transmission in which couplings and brake bands (servo-elements) control the gear ratio and are themselves engaged and disengaged in accordance with pressure applied thereto, a motor-driven slider is provided to connect a main pressure source directly to servo-elements which will remain engaged in the newly selected gear ratio. Solenoid operated valves are interposed between the main pressure source and a second intake port of the slider. Milled channels in the slider connect this second intake port to the servo-elements to be newly engaged during the gear shift. A known gear control unit operates the valves to control the rate of change of pressure increase at the second intake port to a selected value which will limit the jolt of the vehicle to a predetermined maximum jolt.

7 Claims, 5 Drawing Figures

|   |   | 16 | 17 | 20 | 22 | 30 |
|---|---|----|----|----|----|----|
| P | – | 0 | 0 | 0 | 0 | 0 |
| N | – | 0 | 0 | 0 | 0 | 0 |
| 1,2 | 1. | L | 0 | 0 | 0 | L |
| D | 1. | L | 0 | 0 | 0 | 0 |
| D | 2. | L | 0 | L | L | 0 |
| D | 3. | L | L | L | 0 | 0 |
| R | R | 0 | L | 0 | 0 | L |

AUTOMATIC TRANSMISSION UTILIZING A SLIDER FOR PRESSURE DISTRIBUTION TO SERVO-ELEMENTS CONTROLLING THE GEAR RATIO

The present invention relates to automatic transmissions and, in particular, to control systems regulating the engagement and disengagement of servo-elements controlling the gear ratio during the gear shifts.

BACKGROUND AND PRIOR ART

Automatic transmissions are known in which planetary gearing is used and in which gear shifts are effected by the activation of couplings or brake bands (servo-elements) which either range or disengage the annulus, the cage carrying the planet gears or the sun gear. The couplings and brake bands are generally operated hydraulically. The pressure required herefor is furnished by a primary pump which also furnishes the pressure for other hydraulic elements such as a torque converter, the servo-controls, etc. The vehicle in which the automatic transmission is installed generally has a mode selector lever in which a particular one of a plurality of modes, such as P, N, D, 1, 2, or R may be selected by the driver. The main pressure is applied to this lever through a servo-valve. It is also applied to the gear shift valves. The gear shift valves are operated in accordance with the operating conditions of the vehicle and the position of the mode selector lever and cause the main pressure to be applied through throttling elements to the couplings of the transmission, thereby assuring a soft transition.

The known systems of the above described type have the disadvantage that they require a great deal of equipment such as gear shift valves and throttling elements independent of whether the shift points are determined hydraulically or electronically.

THE INVENTION

It is an object of the present invention to furnish a system in which the number of throttling elements and gear shift valves is decreased substantially and in which the hydraulic control in general is simplified. The system according to the present invention is also to be more economical to manufacture and more reliable.

Briefly, the gear shift system comprises distributor means which have a first and second pressure medium intake and a plurality of pressure medium outlets each connected to a corresponding one of the servo-elements controlling the gear ratio. The distributor means includes movable slider means adapted to connect the pressure medium outlet connected to the servo-element to be activated during the gear shift to the second pressure medium intake during the shift operation. Connecting means are furnished which connect the first pressure medium intake directly to the pressure source. Valve means are interconnected between the pressure source and the second pressure medium intake for regulating the pressure transmitted from the pressure source to the second pressure medium intake under control of gear shift control signals which are furnished by a gear control unit in dependence on the then-present operating conditions. The gear shift control signals also operate a moving means, for example a motor, which moves the movable slider means so that it is correctly positioned relative to the pressure medium intakes and outlets for the gear shift operation.

Since the servo-elements to be newly engaged during the gear shift receive a regulated pressure and because the decrease of pressure on the couplings which are to be deactivated is also controlled, insofar as the coupling is not associated with a free wheel, the jolt during the gear shift can be controlled. The pressure regulation in a preferred embodiment is achieved by a combination of two 2/2 solenoid valves which require very little hydraulic fluid for their operation.

DRAWINGS ILLUSTRATING PREFERRED EMBODIMENTS

Figures 1, 2:
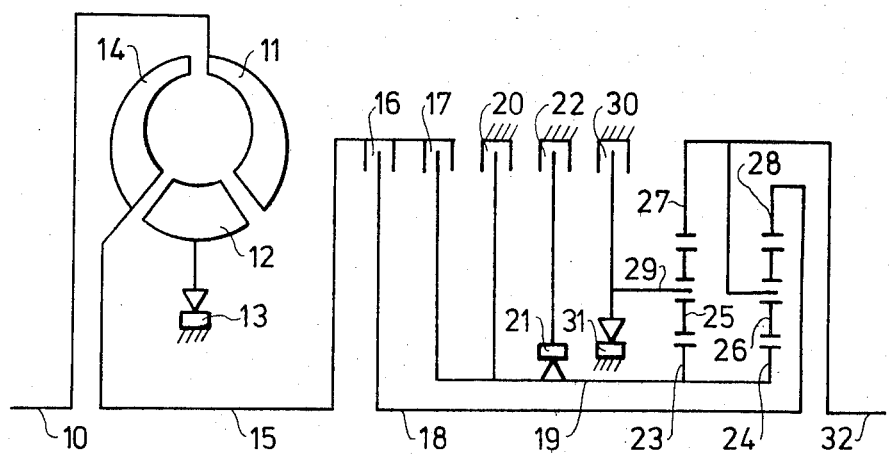
FIG. 1 is a schematic diagram of a known transmission system using a three speed planetary gearing.
FIG. 2 is a Truth Table for activation of the couplings of the transmission shown in FIG. 1 for different driver-selected modes and different gear ratios.

In FIG. 1, a drive shaft 10 is connected to the pump 11 of a torque converter. The stator 12 of the torque converter is connected to a spacially fixed free wheel 13. The turbine 14 of the torque converter transmits force to a shaft 15 to which are fastened couplings 16, 17. Couplings 16 transmits force from shaft 15 to a shaft 18, while coupling 17 transmits force from shaft 15 to a hollow shaft 19. A spatially fixed coupling 20 can prevent hollow shaft 19 from rotating. Shaft 19 further carries a free wheel 21 which is operatively connected to a spatially fixed coupling 22, as well as sun wheels 23, 24 of the planetary gearing. The planetary gearing is a Simpson set and has two planet wheel sets 25, 26. The planet wheel set 25 is held by a planet wheel carrier 29 which is connected to a spatially fixed free wheel 31 and which can be stopped from rotating by a spatially fixed coupling 30. Finally, the planetary gearing has annuli 27, 28, annulus 27 constituting the planet wheel carrier of planet wheel set 26. Annulus 27 is connected with outlet shaft 32, annulus 28 being driven by shaft 18.

A three speed planetary gearing as shown in FIG. 1 and described above is commercially available under type No. 3 HP-20.

FIG. 2 shows a Truth Table for couplings 16, 17, 20, 22 and 30 for the individual gears in each of the driving modes. While in modes P and N all couplings are deactivated, couplings 16 and 30 are activated in first gear in mode 1, 2. This causes planet wheel carrier 29 to be stopped so that motor braking can take place in this mode. If, however, first gear is engaged in mode D, only coupling 16 is activated, planet wheel carrier 29 thrusts against free wheel 31 when under tension, under thrust it is bypassed. No motor braking takes place under these conditions. If the gearing is now switched into second gear, couplings 20 and 22 are activated in addition to coupling 16. Free wheel 31 is bypassed and hollow shaft 19 is supported by free wheel 21. Sun wheels 23 and 24 are therefore stopped. In third gear couplings 16, 17 and 20 are activated. Free-wheels 21 and 31 are bypassed and the whole planetary gear set operates as a block with a ratio of 1:1. If the gearing is switched to reverse, couplings 17 and 30 are activated and a reversal of the direction of rotation of outlet shaft 32 is achieved by the stopped planet wheel carrier 29.

Figure 3:
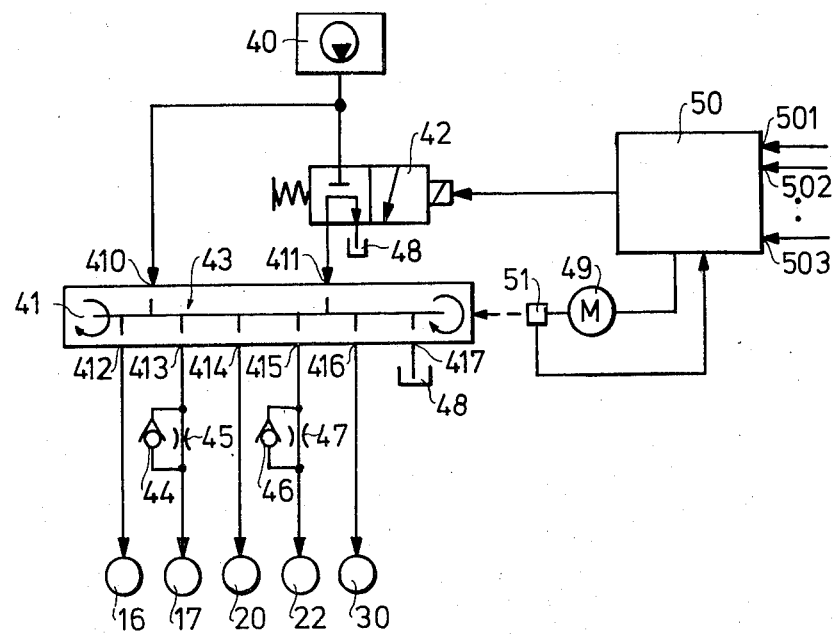
FIG. 3 is a schematic diagram of a first embodiment of a control system for activating the servo-elements of the transmission shown in FIG. 1.

FIG. 3 shows a system for switching the gearing shown in FIG. 1 in accordance with the Truth Table shown in FIG. 2. A pressure source 40 provides the pressure for activating couplings 16, 17, 20, 22 and 30. The main pressure delivered by pressure source 40 is proportional to the load on the engine as, for example, represented by the throttle valve position or the pressure in the intake. This is known and does not form a part of the present invention.

The output of pressure source 40 is directly connected to a first pressure medium intake 410 of a distributor 41. Distributor 41 has a second pressure medium input 411 which is connected to the outlet of pressure source 40 through a 3/1 solenoid valve 42. Valve 42 has an input connected to the outlet of pressure source 40 and an outlet connected to intake 411 of distributor 41. If the normal position of valve 42, the above mentioned input is blocked and the outlet connected to intake 411 of distributor 41 is connected to a reservoir 48. If the actuated state of 3/2 solenoid valve 42, a connection is made between pressure source 40 and intake 411. The distributor 41 has outlets 412, 413, 414, 415 and 416 which are connected to couplings 16, 17, 20, 22 and 30 respectively. A throttle 45 is connected in the line leading from outlet 413 to coupling 17. The throttle is shunted by a check valve 44 which allows pressure medium to flow freely from outlet 413 to coupling 17, but prevents flow in the opposite direction. Similarly, a throttle 47 shunted by a check valve 46 is connected in the line connecting outlet 415 to coupling 22. Distributor 41 has a further outlet 417 which is connected to reservoir 48.

The movable slider 43 within distributor 41 is activated by a servo-motor 49. Servo-motor 49 in turn is controlled by a gear control unit 50 which is known and which furnishes gear control signals in dependence upon the operating parameters of the engine, the selected driving mode, the then-present gear ratio, etc. Gear control unit 50 also activates the solenoid of 3/2 solenoid valve 42. An angle sensor 51 which senses the position of the shaft of motor 49 relative to a reference position furnishes a signal signifying this angle to gear control unit 50. As mentioned above, this information is utilized by gear control unit 50 in addition to operating parameters such as vehicle speed, engine speed, throttle valve position, etc. to generate corresponding gear shift control signals and, also, to regulate the jolt during gear shift. When logic circuitry in gear control unit 50 determines that the proper conditions for a gear shift are present, motor 49 causes slider 41 to be moved to the corresponding position. When slider 41 is a rotary slider as shown in FIG. 3, the movement will of course be a rotation. Gear control unit 50 also times the operation of valve 42 in such a manner that the pressure at input 411 of distributor 41 is such that the proper jolt regulation takes place during gear shift while still allowing adequate pressure for maintaining a coupling in the activated state to be available after gear shift. As will be explained in greater detail below, the pressure distribution achieved by slider 41 is such that the coupling which is to be newly activated during the gear shift is supplied with fluid pressure through intake 411, while the coupling which is to be maintained is directly connected to the outlet of pressure source 40. Timing of 3/2 solenoid valve 42 then allows the engagement of the newly introduced coupling to be carried out in a very smooth manner so that no jolt exceeding a predetermined allowable jolt takes place during gear shift. This increases the riding comfort and at the same time decreases the wear of the couplings. Finally, throttles 45 and 47 allow the pressure on couplings which are to be deactivated during gear shift to decrease slowly rather than all at once, thereby again decreasing jolts during gear shift.

Figure 4:
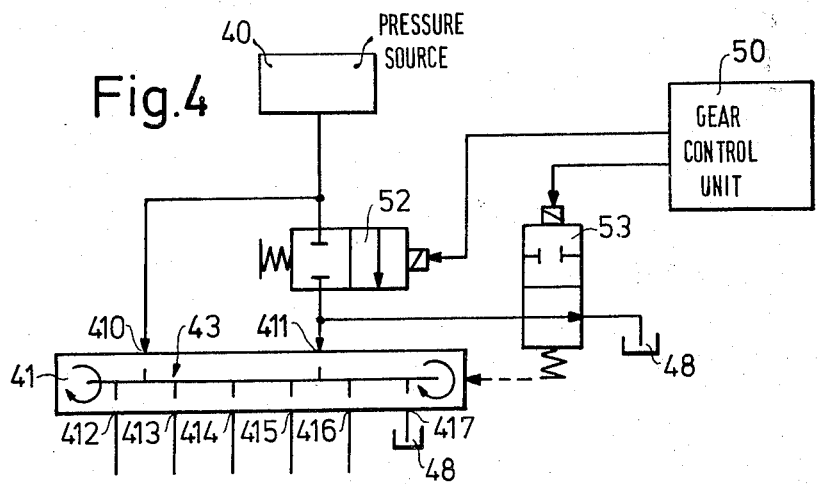
FIG. 4 is a schematic diagram of a second preferred embodiment of a system for activating the servo-elements of the transmission shown in FIG. 1.

FIG. 4 shows an alternate embodiment of a system in accordance with the present invention. As shown in FIG. 4, 3/2 solenoid valve 42 of FIG. 3 is replaced by two 2/2 solenoid valves 52, 53. Solenoid valve 52 is connected between pressure source 40 and intake 411 of distributor 41. Valve 53 is connected between intake 411 and reservoir 48. In the normal position of the two valves, the connection between intake 411 and pressure source 40 is interrupted, while the connection to reservoir 48 exists. While in the embodiment shown in FIG. 3 the pressure which is desired at intake 411 is set by timing of 3/2 solenoid valve 42, this is achieved in the embodiment of FIG. 4 by first activating 2/2 solenoid valve 53. This causes the flow of pressure medium to reservoir 48 to be interrupted. The desired pressure at the second pressure medium intake 411 is now achieved by operation of 2/2 solenoid valve 52. If 2/2 solenoid valve 52 is steadily reset, the pressure is maintained. The pressure medium can then be discharged through intake 411 into reservoir 48 by operation of 2/2 solenoid valve 53 until the pressure has decreased to a desired value. In this way, by alternate operation of valves 52, 53, a predetermined pressure gradient for jolt control can be set at intake 411. The embodiment utilizing two 2/2 solenoid valves 52, 53 has the advantage relative to the system shown in FIG. 3 which utilizes one 3/2 solenoid valve 42 that a desired pressure can be maintained for an arbitrarily long time at the second pressure medium intake 411 without requiring the additional fluid supply as is necessary when operating the 3/2 solenoid valve 43.

Figure 5:
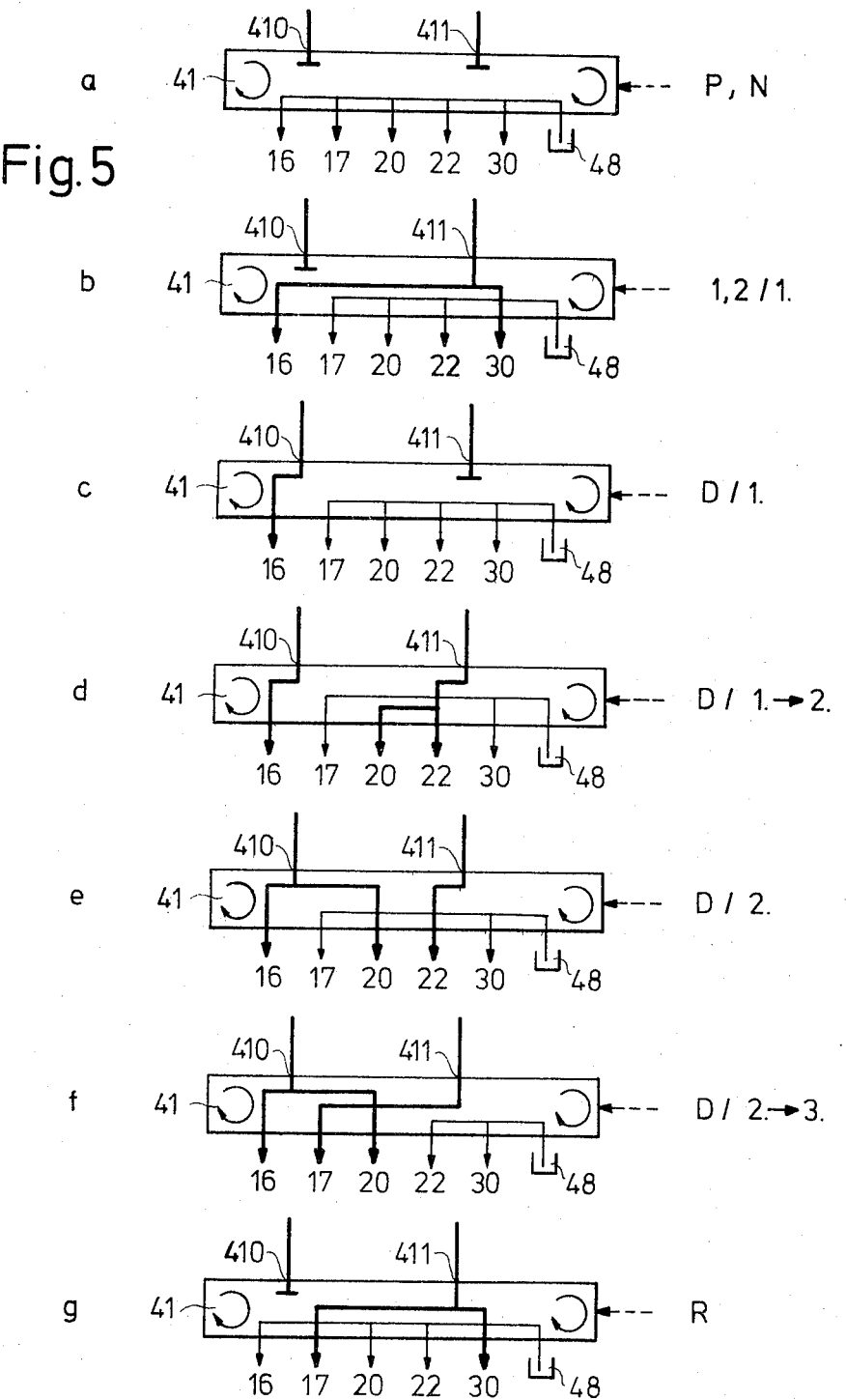
FIG. 5 is a series of diagrams showing the pressure distribution in the systems shown in FIGS. 3 and 4 for different gear ratios and driver selected modes.

FIG. 5 shows the pressure distribution in distributor 41 for the different gear ratios in the different driving modes. Rotary slider 41 in a preferred embodiment is a coaxial slider. The distributor has two intakes and six outlets, channels being milled into the rotary piston of slider 41 in such a manner that the angular position of the piston relative to a reference position determines the interconnections between the intakes and the outlets or among the outlets themselves. The rotary slider can of course be replaced by a suitably formed linear slider.

FIG. 5a shows the position of rotary slider 41 in modes P, N. Both intakes 410, 411 are blocked, while all outlets are interconnected and thereby without pressure since they are all connected to reservoir 48.

FIG. 5b shows the pressure distribution in mode 1, 2, when first gear is engaged. Intake 410 is blocked, intake 411 is connected to couplings 16, 30. Couplings 17, 20 and 22 are not under pressure.

In the pressure distribution shown in FIG. 5c, namely for first gear in mode D, coupling 16 is connected with intake 410, while intake 411 is blocked and all of the other couplings 17, 20, 22 and 30 are connected to reservoir 48.

In FIG. 5d, a shift takes place from first to second gear in mode D. Coupling 16 is connected to intake 410, the second intake 411 is connected to couplings 20 and 22, while couplings 17 and 30 are not under pressure.

FIG. 5e shows the pressure distribution in second gear in mode D. Couplings 16, 20 and 22 are activated, while couplings 17 and 30 are not under pressure. For this final position in second gear, the pressure supply input for coupling 20 is switched to input 410.

FIG. 5f shows the pressure distribution for shifting from second to third gear or the end position for third gear in mode D. As shown, couplings 16, 20 are connected to intake 410 while couplings 17 is connected to intake 411. Couplings 22 and 30 are not under pressure.

FIG. 5g finally shows the distribution for reverse. Intake 410 is blocked, the second intake 411 is connected to couplings 17 and 30. Couplings 16, 20 and 22 are not under pressure.

The shifting between individual gears in each of the driving modes takes place as follows:

If, starting in mode P, the lever is activated through mode N to 1, 2, and first gear is set in, couplings 16 and 30 receive regulated pressure through intake 411. The vehicle is thus put into motion with a jolt regulated in accordance with the jolt regulator in gear control unit 50 as described, for example, in copending applications Ser. Nos. 867,307, 908,933 filed, Jan. 6, 1978, May 24, 1978 inventors: Helmut Rembold et al. Friedrich Rabus Et al. claiming priority of German Application Nos. P. 2700 821.5, P. 2732 298.1 and assigned to the assignee of the present application. Even if the driver moves the selector directly from mode P through mode N into mode D, the rotary slider will pass through the position shown in FIG. 5b, for mode 1, 2. When this intermediate position is being passed, coupling 16 is put under the reduced pressure available at input 411 so that it may be put under the full pressure available at intake 410 when mode D is reached. If now a gear shift from first to second gear is to take place, couplings 20, and 22 must be activated in addition to coupling 16. These couplings, as shown in FIG. 5d, are therefore connected to second input 411 which furnishes a reduced pressure, until the shift process has been completed substantially without jolt. At the end of the shift process the full main pressure is also being applied to intake 411. Coupling 20 is therefore under full pressure and can be switched to input 410 as shown in FIG. 5e. Coupling 22 remains connected to intake 411 since generally speaking a shift to third gear will next take place and coupling 22 is not under pressure in third gear.

When a shift takes place from second into third gear, couplings 16 and 20 remain under full pressure and coupling 17 is activated in a regulated manner via intake 411. Coupling 22 is released, pressure medium flowing from coupling 22 with a certain delay through throttle 47. A positive overlap is thereby established between the operation of couplings 22 and 17 so that a particularly jolt free gear shift can be accomplished without interruption of torque transmission.

Correspondingly, downshift from third to second gear results in a change in the pressure distribution according to FIG. 5f to that according to FIG. 5e. Coupling 17 is deactivated by the delayed outflow of pressure medium through throttle 45 in a controlled fashion, while coupling 22 is similary activated in a controlled manner via intake 411. In similar fashion, the other downshifts take place in accordance with the conditions shown in FIG. 5, but in reverse order. It should be noted that a regulated activation of coupling 30 is not required because of free wheel 31.

Various changes and modifications may be made within the scope of the inventive concept.

We claim:

1. In a transmission having gears operable in a plurality of gear ratios, a control unit (50) for furnishing gear shift control signals signifying a desired shift from a then-present gear ratio to a newly selected gear ratio, a plurality of servo-elements (16, etc.) for controlling the engagement and disengagement of said gears in accordance with pressure applied thereto, said plurality of servo-elements including at least one servo-element to be activated during said desired shift, and a pressure source (40) furnishing a pressure medium at a main pressure:

a gear shift system comprising distributor means (41) having a first and second pressure medium intake (410, 411), a plurality of pressure medium outlets (412-416) each connected to a corresponding one of said servo-elements, and movable slider means adapted to connect the pressure medium outlet connected to said at least one servo-element to said second pressure medium intake during said desired shift;

moving means (49) for moving said movable slider means under control of said gear shift control signals;

connecting means for connecting said first pressure medium intake directly to said pressure source; and valve means (42, 52) interconnected between said pressure source and said second pressure medium intake for regulating transmission of pressure from said pressure source to said second pressure medium intake under control of said gear shift control signals.

2. A transmission as set forth in claim 1, wherein said plurality of servo-elements includes a further servo-element (17) to be deactivated during said desired shift;

further comprising a discharge line connected to said further servo-element, and throttling means (47) positioned in said discharge line for throttling the flow of said pressure medium therethrough.

3. A transmission as set forth in claim 1, wherein said control unit is an electronic control unit;

and wherein said moving means is a servo-motor operative under control of said gear shift control signals.

4. A transmission as set forth in claim 3, wherein said servo-motor is a step motor.

5. A transmission as set forth in claim 3, wherein said movable slider means comprises a rotary slider;

wherein said servo-motor has an outlet shaft coupled to said rotary slider;

further comprising angle sensor means coupled to said rotary slider and connected to said electronic control unit for furnishing an angle signal indicative of the angular position of said rotary slider relative to a reference position to said electronic control unit.

6. A transmission as set forth in claim 1, wherein said valve means comprises a 3/2 solenoid valve.

7. A transmission as set forth in claim 1, wherein said valve means comprises a first 2/2 solenoid valve (52);

further comprising a reservoir (48), and a second 2/2 solenoid valve for connecting said second pressure medium intake to said reservoir.

* * * * *